United States Patent [19]

Arzoumanidis

[11] 4,124,530

[45] Nov. 7, 1978

[54] OLEFIN POLYMERIZATION CATALYST COMPRISING A MONOTERPENIC KETONE AND PROCESS EMPLOYING SAME

[75] Inventor: Gregory G. Arzoumanidis, Stamford, Conn.

[73] Assignee: Stauffer Chemical Company, Westport, Conn.

[21] Appl. No.: 731,267

[22] Filed: Oct. 12, 1976

[51] Int. Cl.$^2$ ............................................... C08F 4/64
[52] U.S. Cl. .................................. 252/429 B; 526/142
[58] Field of Search ..................................... 252/429 B

[56] References Cited

U.S. PATENT DOCUMENTS

| | | | |
|---|---|---|---|
| 3,129,256 | 4/1964 | Hay et al. | 252/429 B X |
| 3,530,107 | 9/1970 | Yoshioka et al. | 252/429 B X |
| 3,549,717 | 12/1970 | Itakura et al. | 252/429 B X |
| 3,701,763 | 10/1972 | Wada et al. | 252/429 B X |
| 3,843,619 | 10/1974 | Calcagno et al. | 252/429 B X |

*Primary Examiner*—Patrick Garvin
*Attorney, Agent, or Firm*—M. E. Zall

[57] ABSTRACT

A catalyst component comprising a titanium trichloride material and a saturated monocyclic monoterpenic ketone or a bicyclic monoterpenic ketone. A catalyst employing the component and an organoaluminum compound is used to polymerize alpha olefins, and particularly propylene. The monoterpenic ketone is effective in increasing the stereoregularity of the polymer.

30 Claims, No Drawings

OLEFIN POLYMERIZATION CATALYST COMPRISING A MONOTERPENIC KETONE AND PROCESS EMPLOYING SAME

BACKGROUND OF THE INVENTION

This invention relates to a catalyst component and system suitable for use in the polymerization of alpha olefins and to a process employing the catalyst system.

Catalyst systems composed of a titanium halide and an organoaluminum compound have been widely used in the polymerization of alpha olefins. However, the basic two-component catalyst system has disadvantages that prior art researchers have recognized and attempted to obviate. Thus, with some alpha olefins these systems generally result in the formation of a polymer having a substantial amount of amorphous, or hydrocarbon soluble polymer, which must be separated from the desired crystalline, or hydrocarbon insoluble product. The production of stereoregular, crystalline polymers is a particularly desirable objective in many olefin polymerization processes.

In addition to the goal of providing stereoregular polymers, catalyst activity is an important factor in this area. Thus, it is economically important that higher amounts of polymer be formed per unit time per unit of catalyst employed in the polymerization process.

Various approaches to solving the aforementioned problems have been proposed in the art. Thus, it is known that the reduction of titanium terahalide with aluminum or hydrogen followed by grinding provides a catalyst of increased activity when the ground component is admixed with an organoaluminum compound. However, the increased activity is offset by the production of large amounts of amorphous polymer. U.S. Pat. No. 3,701,763 to S. Wada et al teaches that stereoregular polymers can be provided if the titanium trichloride component is pulverized in the presence of a large amount of auxiliary components, including certain aliphatic and aromatic ethers, amines and ketones, until the α or γ- type of the X-ray diffraction pattern of the crystal form of the titanium trichloride cannot be identified, and the resulting titanium trichloride composition extracted with certain solvents. In U.S. Pat. No. 3,850,899, also to S. Wada et al., the solvent used to extract the titanium trichloride composition can be one of these ketones. The use of aliphatic and aromatic ketones is also described in U.S. Pat. No. 3,210,332 to H. D. Lyons and C. W. Moberly, which teaches the in situ addition of these ketones to a polymerization process employing the conventional alkyl aluminum-titanium trichloride catalyst in order to maximize the production of stereoregular polymer.

While conferring some improvement on the properties of the resultant polymer, many of the prior art auxiliary components present disadvantages that are not off-set by an improvement in polymer properties. For example, hexamethyl phosphoramide, a widely used auxiliary component, recently has been found to be carcinogenic, and dimethylpropionamide is reported to be a possible carcinogen. Many of the ethers used as auxiliary components are highly flammable, autooxidizable liquids capable of producing explosive peroxides.

Aromatic ketones such as benzophenone and substituted benzophenones are known photosensitizers, a characteristic which could affect the stability of the resultant polymer. Other aromatic ketones such as benzanthrone and benzosuberone have been found to provide polymers having a low isotactic content.

Now it has been found in accordance with this invention that catalyst systems containing selected terpenic ketones are efficacious for the preparation of polyolefins, and obviate many of the drawbacks inherent in prior art auxiliary components.

SUMMARY OF THE INVENTION

The catalyst component of this invention comprises a titanium trichloride material and a saturated monocyclic monoterpenic ketone or a bicyclic monoterpenic ketone. When activated by an organoaluminum compound, a catalyst is obtained which provides polymers of improved stereoregularity.

DETAILED DESCRIPTION OF THE INVENTION

More particularly, the critical constituent of this invention is a selected monoterpenic ketone. By the term "monoterpenic ketone" in the claims and specification herein is meant a ketone based on two isoprene units and containing ten carbon atoms. The monoterpenic ketones suitable for use in this invention are saturated monocyclic or bicyclic. Exemplarly saturated monocyclic ketones include menthone and carvomenthone. Exemplarly bicyclic monoterpenic ketones include thujone, carone, verbanone, verbenone, camphor and fenchone. Mixtures of two or more of the aforementioned monoterpenic ketones can also be employed.

The titanium trichloride material which is suitable for use in the present invention can be produced in a variety of ways including: (a) by reduction of titanium tetrachloride with a metal such as aluminum or titanium, said reduced titanium material being either milled or unmilled, the latter being preferred; (b) by reduction of titanium tetrachloride with hydrogen; (c) by reduction of titanium tetrachloride with an organometallic compound such as an aluminum alkyl; or (d) by grinding a combination of titanium trichloride and a halide of a Group III metal, such as an aluminum halide. Examples of suitable titanium trichloride starting materials are well known in the art and are described in a number of publications and patents, including U.S. Pat. Nos. 3,639.375 and 3,701,763 which are each incorporated herein by reference as showing the type of titanium trichloride starting material that is to be used in the present invention.

The monoterpenic ketone is employed in an amount from about 2% to about 15%, by weight of the titanium trichloride material, and preferably from about 2.5% to about 10%. The total weight of the titanium trichloride material is considered in calculating the amount of monoterpenic ketone, thus, $3TiCl_3 \cdot AlCl_3$ and not merely the $TiCl_3$ part of the material is considered where the aluminum reduced titanium halide is used.

It is preferred in the practice of this invention to pulverize the titanium trichloride material with the monoterpenic ketone prior to activation with the organoaluminum compound. The grinding can be carried out in a ball mill or other suitable size reduction apparatus in the absence of diluents, and in an inert atmosphere, such as nitrogen or argon, which is substantially free of oxygen, water and other catalyst poisons, at a temperature and for a length of time which are suitable to reduce the mixture contained therein to a pulverulent composition which when combined with organoaluminum compounds produces a catalyst having a good activity and stereoregularity in the polymerization of alpha olefins.

Generally, if conventional ball mills are used, the grinding should take place for a period of time of from about 30 hours to about 90 hours at a temperature of about 30° C. to about 70° C. Especially good results are obtained when the temperature is held at from about 45° C. to about 65° C., preferably from about 50° C. to about 60° C., and the grinding is carried out at from about 40 hours to about 80 hours. One suitable apparatus for carrying out the grinding is described in U.S. Pat. No. 3,688,992 to A. Schallis. In this particular apparatus, which as a fast grinding rate, shorter milling times, e.g., 3-12 hours, can be used, although longer times can also be employed.

When measuring the temperatures the actual temperature in the interior of the milling apparatus can be either measured directly or is extrapolated from prior runs.

It is often desirable to employ a third component in the practice of this invention. This third component can function to further improve the stereoregularity of the polymer, to improve the activity of the catalyst, or to prevent catalyst component agglomerization where the titanium trichloride material and the monoterpenic ketone are pulverized together. The use of such compounds is described in copending application Ser. No. 643,438, filed December 22, 1975 and now abandoned. Such a compound appears to appears to control the agregative behavior of the finely divided particles produced during the grinding operation and assures the stability of the resulting powdery product. by retaining the discreteness of the individual particles with substantially no agglomeration. This third component can be an ionic compound or a polar compound.

The following are representative examples of such ionic compounds:

(1) The ionic salts of the Group IA metals. Examples are halide salts such as lithium fluoride, lithium chloride, lithium bromide and lithium iodide and the analogous halide salts of the elements sodium, potassium, rubidium and cesium. The alkali metal salts of other common anions such as the sulfate, nitrate, stearate, borate, silicate, aluminate, citrate and thiosulfate are also to be considered as within this class;

(2) The ionic salts of the Group IIA metal ions which are analogous to the salts set forth above under subclass 1;

(3) the ionic salts of the transition metals. Particularly preferred are the stearate salts of copper and zinc;

(4) quaternary ammonium salts of the general formula $R_4N^+X^-$, where R is hydrogen, alkyl or aryl and X is halide or sulfate. The trialkyl hydrochlorides, hydrobromides and hydroiodides, preferably the $C_1-C_4$ trialkyl compounds thereof, are examples of suitable compounds. An exemplary compound is triethylamine hydrochloride;

(5) the finely divided, water-soluble ammonium salt of an amido polyphosphate wherein substantially all of the particles are less than 5 microns in diameter. It is formed by the dry vapor phase reaction of $P_2O_5$ with anhydrous ammonia as described in U.S. Pat. No. 2,122,122 to Woodstock. A typical analysis for such a product is:

|  | % |
|---|---|
| $P_2O_5$ | 76.1 |
| $NH_3$, free | 15.4 |
| $NH_3$, Total | 22.4 |
| Amide N as $NH_3$ | 7 |
| pH (1% solution) | 5.6 |

A suitable product of this type is available under the trademark "Victamide" from Victor Chemical Division of Stauffer Chemical Company, Westport, Connecticut.

(6) the salts of aliphatic triacids, preferably the $C_1-C_4$ alkyl triacids and the hydroxy substituted derivatives of such acids. One such acid is 2-hydroxy-1,2,3-propanetricarboxylic acid, which is citric acid. The alkali, alkaline earth metal salts and transition metal salts admixed with one of the foregoing anions are preferred. Two compounds which are effective are calcium citrate and ferric ammonium citrate. Use of the salts of dicarboxylic acids, such as the tartrates, is not effective;

(7) The alkyl alkali metal sulfates, preferably the $C_1-C_{18}$ alkyl substituted compounds. A suitable compound is dodecyl sodium sulfate;

Preferably, the alkali metal halides and nongaseous halogens are employed as ionic compounds suitable as third components.

Exemplary polar compounds useful as third components in the present invention, are:

(1) alkyl acid pyrophosphates of the formula

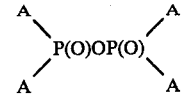

where A is selected from the group consisting of OR and OH, where R is $C_1-C_4$ alkyl, with the proviso that at least one A is OR. Exemplary are the $C_1-C_4$ dialkyl acid pyrophosphates, e.g., dimethyl acid pyrophosphates, such as dimethyl acid pyrophosphate;

(2) trialkyl phosphates of the formula

where R is an alkyl group, preferably a $C_1-C_6$ alkyl group. A preferred compound selected from this class is tributyl phosphate.

(3) polymeric silicon compounds selected from the group consisting of amorphous silica and the siloxanes.

Amorphous silica has been defined as substantially dehydrated, polymerized silica which may be considered as a condensation polymer of silicic acid. A suitable amorphous silica which can be used in the present invention is colloidal silica. It is available commercially, for example, under the trademark "Cab-O-Sil" from Cabot Corporation, and it comprises colloidal silica particles sintered together in chain-like formations.

Also useful as third components for use herein are the siloxanes. These are straight chain compounds, analogous to paraffin hydrocarbons, consisting of silicon atoms bonded to oxygen and so arranged that each silicon atom is linked with two oxygen atoms. The preferred siloxanes are those which are $C_1-C_4$ alkyl substituted, e.g., hexamethyl siloxane and polydimethylsiloxane.

(4) the dialkyl phosphoric acids of the formula

where R is an alkyl, preferably a $C_1$–$C_6$ alkyl goup. One compound which is useful is diisoamyl phosphoric acid wherein the alkyl group is the isoamyl group;

(5) the dialkyl maleates and fumarates, preferably the $C_1$–$C_4$ dialkyl maleates and fumarates. Diethyl maleate is one such compound which is effective;

(6) the reaction product of a compound of the formula $(C_6H_5)_2Si(OH)_2$ and a titanate of the formula $Ti(OR)_4$, where R is an alkyl group, preferably a $C_1$–$C_4$ alkyl group. This type of product can be formed in accordance with U.S. Pat. No. 3,758,535 to Vizurraga.

(7) the compounds of the formula $RCONH_2$ where R is alkyl, preferably a $C_1$–$C_{18}$ alkyl group, and the polymeric alkylamides. Propionamide, stearamide, and polyacrylamide are three representative third components from this class of compounds;

(8) an elemental solid selected from the group consisting of graphite, amorphous carbon and sulfur. Two preferred substances from this group include graphite, which is one of the crystalline allotropic forms of carbon (the other being the diamond) and sulfur;

(9) starch;

(10) the alkyl ketones with the proviso that the total number of carbon atoms in the two alkyl groups ranges from 20 to 30. Some exemplary ketones are laurone, which has the formula $(C_{11}H_{23})_2CO$, and 14-heptacosanone which has the formula $(C_{13}H_{27})_2CO$;

(11) epoxides and the polymeric derivatives of such compounds. Two compounds from this class include the diepoxide of cyclohexenylmethyl cyclohexene carboxylate and poly(ethylene oxide) which is a water-soluble polymer made by polymerizing ethylene oxide, e.g., by the use of alkaline catalysis;

(12) the trialkyl borates, preferably the $C_1$–$C_4$ trialkyl borates. A representative compound from this group is trimethylborate;

(13) urea and the alkyl substituted ureas, preferably the $C_1$–$C_4$ alkyl substituted ureas. Two compounds from this class are urea itself and tetramethyl urea;

(14) the alkylene diamine tetraacetic acids, preferably the $C_2$14 $C_4$ alkylene compounds thereof. A preferred compound is ethylene diamine tetraacetic acid;

(15) the water soluble cellulose ethers including methyl cellulose and sodium carboxymethyl cellulose;

(16) the phthalocyanine colorants including phthalocyanine copper phthalocyanine, chlorinated copper phthalocyanine and sulfonated copper phthalocyanine. The preferred compound is copper phthalocyanine;

(17) the $C_1$–$C_4$ acrylates. A preferred reagent is methyl acrylate;

(18) compounds of the formula $(PNX_2)_n$ where X is chlorine or bromine and $n$ is from 2 to 4. A preferred compound is $(PNCl_2)_n$ where $n$ is 3 or 4;

(19) compounds of the formulae

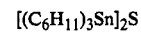

where R is $C_1$–$C_6$ alkyl. Methods for preparing the above compounds are given in (a) Belgian Pat. No. 783,532 and (b) U.S. Pat. No. 3,264,177, respectively; and

(20) the non-gaseous alpha-olefins, such as 1-eicosene. Mixtures of two or more third components including mixtures of polar and ionic types, can also be employed.

The preferred polar compounds are the amides described in 7) and the alkyl ketones described in 10).

The amount of third component which is employed is quite small. Generally, from about 0.1% to about 100% by weight of the monoterpenic ketone is effective. A preferred amount is from about 0.2% to about 30.0% by weight, with an amount from about 0.5 to aoout 20.0% by weight being particularly preferred.

Suitable organoaluminum compounds include those conventionally used as alpha olefin polymerization catalyst components. Examples include trialkyl aluminum, alkyl aluminum sesquihalides, dialkylaluminum halides, alkylaluminum dihalides, dialkylaluminum alkoxides, alkylaluminum alkoxy halides, etc. The individual alkyl group in these compounds can have from 1 to 18 carbon atoms, and the compounds can have up to 40 carbon atoms. The following are examples of suitable organoaluminum compounds: trimethyl aluminum, triethyl aluminum, tributyl aluminum, triisobutyl aluminum, trioctyl aluminum, tridodecyl aluminum, methyl aluminum sesquichloride, ethyl aluminum sesquichloride, diethyl aluminum chloride, ethyl aluminum dichloride, dibutyl aluminum chloride, diethyl aluminum sesquibromide, and mixtures thereof. Dialkylaluminum halides, such as diethyl aluminum chloride, are preferred as organo-aluminum compounds for the polymerization of propylene.

The product of the present invention can be used for the production of polymers of alpha-olefins having from 2 to 8 carbon atoms, including propylene homopolymers, ethylene homopolymers, copolymers of propylene and ethylene, and homopolymers of butene-1, 3-methylbutene-1, 4-methylpentene-1, etc. The polymerization of such monomers is generally carried out at temperatures anywhere from about 10° C. to about 150° C. using pressures of from about 0.5 to about 100 atmospheres. Where the titanium trichloride material has been ground with the monoterpenic ketones, either alone or in the presence of a third component, the pulverized catalyst component is either mixed with the organoaluminum compound prior to its addition to the polymerization reactor, or the ground material and the organoaluminum compound can be added separately to the reactor. Where the titanium trichloride material and the monoterpenic ketone have not been pulverized together the individual components are added to the reaction, either separately or in admixture with the organoaluminum compound. In this embodiment, the optional third component can be added separately or in admixture with any of the necessary ingredients.

Although, as previously indicated, it is preferred to pulverize the monoterpenic ketone with the titanium trichloride material, in situ addition of the ketone to the polymerization reactor is also within the scope of this invention. In this embodiment, generally from about 5 to about 200% by weight based on the titanium trichloride material can be used, although amounts under 100% are preferred. If the activity drops upon the addition of a large quantity of ketone, a higher activity can be achieved by increasing the amount of alkyl aluminum compound used to activate the catalyst.

While any of the previously described monoterpenic ketones can be employed in the practice of this invention, preferred embodiments employ the bicyclic ketones; camphor is especially preferred.

The following Examples will serve to illustrate the practice of this invention.

EXAMPLE 1

A. Preparation of Catalyst Composition

A laboratory ball mill of 11 cm inside diameter and 15 cm long was charged with 875 grams of 1 cm diameter magnetized steel balls, rinsed with reagent grade acetone, dried in an oven at 60° C. then placed in a glove box operated under nitrogen with rigid exclusion of air and moisture.

Camphor (about 2.7g) was then loaded into the mill and the mill shaken to disperse the camphor thoroughly. To the mill was then added 50 grams of titanium trichloride which had been obtained by reducing titanium tetrachloride with aluminum metal. It is a co-crystallized product corresponding to the formula $3TiCl_3 \cdot AlCl_3$ ("$TiCl_3A$" from Stauffer Chemical Company, Specialty Chemical Division, Westport, Connecticut). The mill was shaken again to insure mixing of the contents, then closed so as to be air-tight and was rotated at 110 rpm. for 45 hours at 50° C. The temperature was maintained via a system comprising a thermocouple inserted in a well inside the mill, a temperature controller and a temperature recorder. External heat was provided via infrared radiation. At the end of the 45 hour period, the essentially agglomeration free finely divided catalyst component was transferred to a jar in the glove box and was tested, as outlined in part B., for activity and isotactic index.

B. Preparation of Polymer

The Example sets forth the testing procedure that was utilized to determine the activity of the catalyst and isotactic index of the product formed using the type of catalyst components described in part A.

To a one gallon jacketed autoclave equipped with a stirrer that was set at 600 rpm. was charged 1 liter of dry heptane. About 0.3 grams of the product from part A. was suspended in the heptane under a nitrogen atmosphere, 500 additional ml. of heptane was added followed by 8 ml. of a 20% by weight solution of diethyl aluminum chloride in heptane. An additional 0.5 liter of dry heptane was charged into the autoclave, and the autoclave was then closed. The temperature was raised to 70° C., and the autoclave was vented to release the nitrogen pressure build-up; then hydrogen gas was charged to give a partial pressure of 3.2 lbs./in.$^2$ and propylene admitted to give a total pressure of 142 lbs./in.$^2$. During the polymerization, additional propylene was fed as needed to maintain this pressure. The propylene had been purified by being passed through a column of a copper based catalyst to remove trace amounts of oxygen and through a molecular sieve resin (Linde type 4A) to remove traces of water. The polymerization test was carried out for three hours. At the end of this period the catalyst was destroyed by addition of an iso-propanol/methanol mixture, then the polymer product was filtered, washed with an iso-propanol/water mixture, dried at 70° C. overnight and was weighed. About 10 grams of the dry polymer was extracted with heptane for three hours in a Soxhlet apparatus. The percentage amount of the non-extracted portion of the polymer was designated "$C_7i$". From an aliquot of the combined filtrates and wash liquors was determined, via solvent evaporation, the amount of the soluble polymer present in the filtrates.

The catalyst activity was defined as the amount of dry solid, polymer (obtained from the reaction) in grams per gram of $TiCl_3$-containing catalyst composition made in accordance with paragraph A; the average activity for two runs was 999.

The isotactic index (II), which is a measure of the insoluble polymer produced was defined by the following formula:

$$II = \frac{C7i \times \text{Wt. Solid Polymer}}{\text{Wt. Total Polymer Produced}}$$

The total polymer produced includes the above-described insoluble material (isotactic) and the polymer soluble in boiling heptane and soluble in the combined filtrate and wash liquors. An average II of 93.3 was obtained for two runs of polymer produced employing the catalyst composition of paragraph A.

COMPARATIVE EXAMPLE 1

In order to demonstrate the efficacy of camphor, "$TiCl_3.A$" alone (50 grams) was milled for 48 hours at 50° C. Following the polymer preparation conditions of Example 1, an average activity of 796 and an average II of 89.6 for two polymerization runs was obtained. A duplicate batch of milled "$TiCl_3.A$" was prepared; two polymerization runs using this material resulted in an average activity of 828 and an average II of 89.6. These data reflect both a lower activity and a lower II when a terpenic ketone was not employed.

EXAMPLE 2

Example 1 was repeated with the exception that about 2.8 grams of camphor was used, the camphor was mixed with about .058 grams of sodium bromide prior to adding it to the mill, and grinding was carried out at 50° C. for 43 hours. An activity of 1350 and an II of 94.4 were obtained using the polymerization procedure of Example 1 but employing 5 ml. of the 20% by weight solution of diethyl aluminum chloride in heptane.

EXAMPLE 3

Another portion of the catalyst of Example 2 was employed to prepare polymer according to Example 1; an activity of 1386 and II 92.3 were obtained.

EXAMPLE 4

Again, a portion of the catalyst of Example 2 was employed to prepare polymer in accordance with Example 1, with the exception that about 0.627 grams of catalyst component was employed in the polymerization; an activity of 1188 and an II of 94.6 were obtained.

EXAMPLE 5-6

In these two Examples, the catalyst of Example 2 was tested again according to the polymerization procedure of Example 1 with the exception that 5 ml. of the 20% by weight diethyl aluminum chloride solution in heptane were used, and a polymerization temperature of 65° C. was employed in Example 5 and 60° C. in Example 6. An activity of 1247 and an II or 93.4 were obtained for Example 5, while Example 6 provided a catalyst with an activity of 1147 and an II of 94.0.

EXAMPLE 7

In order to demonstrate the effectiveness of camphor as an electron donor in a different type of milling apparatus, 6,525 grams of "TiCl₃.A" and 367 grams of camphor were ground for 11 hours at 48°–50° C. in the

EXAMPLES 10-17

Following the general procedure of Example 7, catalyst compositions were prepared from "TiCl₃.A", camphor and sodium bromide. The amounts and conditions differing from those specified in Example 7 for both the catalyst composition preparation and the polymerization together with the resultant activity and II data, are set forth in Table 1. Where more than one polymerization run was made, the reported activity and II is the average for the runs.

TABLE 1

| Example | Camphor (% by weight of "TiCl₃ . A") | NaBr (% by weight of "TiCl₃ . A") | Milling Temperature | Milling Time | No. of Runs | Activity | II |
|---|---|---|---|---|---|---|---|
| 10 | 6.7% | 0.13 | 1 hr. at 35–42° C. 8 hrs. at 45–53° C. | 9 hours | 2 | 1460 | 93.9 |
| 11 | 6.9% | 0.14 | 1 hr. at 36–45° C. 8 hrs. at 38–53° C. | 9 hours | 2 | 1280 | 95.8 |
| 12 | 5.13% | 0.10 | 2 hrs. at 35–47° C. 9 hrs. at 47–54° C. | 11 hours | 2 | 1296 | 91.9 |
| 13 | 5.4% | 0.11 | 3 hrs. at 40–48° C. | 11 hours | 3 | 1452 | 95.0 |
| 14⁽¹⁾ | 5.9% | 0.13 | 3 hrs. at 28–45° C. 8 hrs. at 40–50° C. | 11 hours | 2 | 1270 | 95.6 |
| 15 | 5.4% | 0.11 | 1.25 hrs. at 37–47° C. 9.75 hrs. at 40–50° C. | 11 hours | 2 | 1227 | 96.0 |
| 16 | 5.3% | 0.11 | 1.5 hrs. at 35–45° C. 9.5 hrs. at 45–51° C. | 11 hours | 3 (3 prior to sieving) | 1268 1407 | 96.5 96.4 |
| 17 | 4.8% | 0.10 | 2.5 hrs. at 36–45° C. 9.5 hrs. at 40–49° C. | 11 hours | 3 (2 prior to sieving) | 1321 1524 | 94.0 93.5 |

⁽¹⁾The ingredients charged were 5,500 grams of "TiCl₃ . A", 1000 grams of milled TiCl₃ . A-camphor from Example 13, 350 grams of fresh camphor and 7 grams of NaBr.

apparatus described in U.S. Pat. No. 3,688,992 to A. Schallis. The apparatus contained 200 pounds of 0.5 inch diameter magnetized stainless steel balls. The energy input was 7.5 amps. and the rotation speed employed was 285 rpm. The ground "TiCl₃.A"-camphor was sieved to remove any particles above 106μ in diameter.

Two polymerization runs were made using the sieved "TiCl₃.A"-camphor described above following the general procedure of Example 1, part B. The polymerization were carried out for four hours at 70° C. An average activity of 1438 and an average II of 92.8 were obtained.

EXAMPLE 8

Example 7 was repeated with the exception that 6,200 grams of TiCl₃.A were used. An average activity for two polymerization runs of 1270 and an average II of 90.8 were obtained. Since the properties of this catalyst were not as good as those of Example 7, it was suspected that the catalyst component was contaminated during grinding.

EXAMPLE 9

Again Example 7 was repeated, but employing 5,860 grams of TiCl₃.A and 330 grams of camphor. For two polymerization runs, the average activity was 1222 and the average II was 93.4.

COMPARATIVE EXAMPLE 2

About the same amount of "TiCl₃.A" used in Example 7 was milled alone, without camphor, as described in that Example. An average activity of 1150 and an average II of 90.1 for two polymerization runs was obtained.

EXAMPLE 18-19

In order to demonstrate efficacy of the invention under a reduced grinding rate, the equipment described in Example 7 was used but loaded with 150 pounds of the steel balls. The energy input was 6 amps and the rotation speed 285 rpm. The conditions of Example 1 were employed, unless otherwise specified.

In Example 18, the amounts of 8100 grams of "TiCl₃.A", 455 grams of camphor and 9.1 grams of sodium bromide were milled at 24°–40° C. for 2 hours and then at 48°–52° C. for 11 hours; for two polymerization runs an average activity of 1173 and an average II of 95.2 was obtained.

Example 19 was essentially a duplicate of Example 18 with the exception that 8165 grams of "TiCl₃.A" were used and the components were milled at 40°–48° C. for the first 1.5 hours and then at 48°–52° C. for 11.5 hours. For two polymerization runs, an average activity of 1107 and an average II of 95.3 was obtained.

COMPARATIVE EXAMPLE 3

The amount of 8625 grams of "TiCl₃.A" was milled alone, without camphor, or sodium bromide, as described in Examples 18-19. Milling was carried out at 24°–40° C. for 3 hours and then at 48°–52° C. for 11 hours. An average activity of 1164 and an II of 89.8 for two polymerization runs was obtained.

EXAMPLES 20-34

These Examples illustrate the use of various terpenic ketones other than camphor, both alone and in the presence of a third component. Both the procedure and the equipment described in Example 1 were employed; ingredients, conditions and results are set forth in Table 2. In all instances 8 ml. of the diethyl aluminum chloride solution were used in the polymerizations and the polymerizations were carried out at 70° C. Comparative Example 1 may be referred to for comparison of the 3 hour polymerization runs; Comparative Example 4 (C-4 in Table 2) is a duplicate of Comparative Example 1 with the exception that the polymerizations were carried out for 4 hours.

rachloride with hydrogen, and is available from Stauffer Chemical Company, Specialty Chemicals Division, Westport, Connecticut. Two portions of the milled catalyst component, one weighing 571.1 mg. and one weighing 605.7 mg., were employed in polymeriza-

TABLE 2

| Example | % by weight ketone based on "TiCl₃ . A" | % by weight TC[1] based on Ketone | Milling Temperature | Milling Time | Polymerization Time | No. of Runs | Activity | II |
|---|---|---|---|---|---|---|---|---|
| C-4 | NONE | NONE | 50° C | 48 hours | 4 hours | 2 | 1065 | 88.6 |
| C-4 (duplicate) | NONE | NONE | 50° C | 48 hours | 4 hours | 3 | 998 | 89.1 |
| 20 | 3.4%d,l-fenchone | NONE | 50° C | 48 hours | 3 hours | 3 | 830 | 90.5 |
| 21 | 3.5%d,l-fenchone | NONE | 45° C | 48 hours | 3 hours | 2 | 702 | 92.7 |
| 22 | 3.5%d,l-fenchone | 3.3% I₂ | 50° C | 43 hours | 3 hours | 3 | 987 | 91.5 |
| 23 | 3.5%d,l-fenchone | 3.3% I₂ | 50° C | 43 hours | 4 hours | 1 | 964 | 91.4 |
| 24 | 3.4%d,l-fenchone | 3.5% stearamide | 50° C | 48 hours | 3 hours | 2 | 856 | 93.8 |
| 25 | 3.4%d,l-fenchone | 3.5% stearamide | 50° C | 48 hours | 4 hours | 1 | 986 | 86.5 |
| 26 | 5.1%,thujone (α&β) | NONE | 50° C | 48 hours | 3 hours | 2 | 1014 | 92.3 |
| 27 | 5.2%, thujone (α&β) | 2.2% NaBr | 50° C | 48 hours | 3 hours | 2 | 1054 | 92.5 |
| 28 | 5.2%, thujone (α&β) | 2.3% Ca Phosphate (tribasic) | 50° C | 48 hours | 3 hours | 2 | 978 | 95.0 |
| 29 | 3.1% menthone | NONE | 47-50° C | 48 hrs. | 3 hrs. | 2 | 1115 | 92.1 |
| 30 | 3.1% menthone | NONE | 47-50° C | 48 hrs. | 4 hrs. | 2 | 1179 | 91.2 |
| 31[3] | 3.1% menthone | 3.6% I₂ | 50° C | 48 hrs. | 3 hrs. | 1 | 543 | 86.2 |
| 32 | 3.3% menthone | 3.0% I₂ | 50° C | 48 hrs. | 3 hrs. | 2 | 864 | 93.4 |
| 33 | 3.1% menthone | 3.1% laurone | 50° C | 48 hrs. | 4 hrs. | 1 | 1021 | 93.4 |
| 34 | 3.1% menthone | 3.1% laurone | 50° C | 48 hrs. | 3 hrs. | 2 | 765 | 92.1 |

[1]TC=Third Component
[2]"Cab-O-Sil" colloidal silica, sold by Cabot Corporation.
[3]Believed to be contaminated; 25% agglomeration observed.

EXAMPLES 35-49

In order to demonstrate the efficacy of in situ addition of terpenic ketones, a series of runs was made in which the titanium trichloride material was added first to the autoclave, followed by camphor and then 8 ml. of the 20% by weight solution of diethyl aluminum chloride in heptane. In Example 51, 12 ml. of the diethylaluminum chloride solution were added. The titanium trichloride used was "TiCl₃1.1" which corresponds to the "TiCl₃.A" of the preceding examples which has been milled at 50°-60° C. for 48 hours and classified to remove large chunks and fine particles. The equipment and procedure of Example 1, Part B were employed. (In example 46, the diethyl aluminum chloride was added first, followed by the camphor and then by the "TiCl₃ 1.1".

Table 3

| Ex. | "TiCl₃ . 1.1" | % by weight camphor based on "TiCl₃ . 1.1" | Activity | II |
|---|---|---|---|---|
| C-5 (7 runs) | 358.1 mg. ave. | — | 934±67 | 89.0±1.3 |
| 35 | 663.1 mg. | 0.23 | 783 | 92.2 |
| 36 | 532.6 mg. | 0.23 | 821 | 90.5 |
| 37 | 642.9 mg. | 5.5 | 822 | 89.9 |
| 38 | 580.4 mg. | 5.5 | 891 | 90.4 |
| 39 | 517.8 mg. | 11.0 | 1045 | 91.4 |
| 40 | 638.2 mg. | 11.0 | 855 | 92.5 |
| 41 | 472.4 mg. | 13.3 | 825 | 92.7 |
| 42 | 548.1 mg. | 22.0 | 828 | 90.1 |
| 43 | 623.1 mg. | 22.0 | 849 | 91.6 |
| 44 | 716.8 mg. | 44.0 | 827 | 89.5 |
| 45 | 558.5 mg. | 44.0 | 831 | 90.4 |
| 46 | 623.6 mg. | 75.0 | 733 | 88.8 |
| 47 | 442.2 mg. | 100.0 | 805 | 91.8 |
| 48 | 651.8 mg. | 100.0 | 762 | 89.1 |
| 49 | 519.3 mg. | 200.0 | 331 | 89.8 |
| 50 | 650.8 mg. | 200.0 | 35 | 55.1 |
| 51 | 587.8 mg. | 200.0 | 670 | 89.6 |

EXAMPLE 52

Following the procedure of Example 1, 50.0 grams of "TiCl₃.H" were milled with 5.6% by weight camphor, based on the "TiCl₃.H", for 48 hours at 43° C. "TiCl₃.H" is obtained by the reduction of titanium tettions following the procedure of Example 1; an average activity of 584 and an average II of 85.5 was obtained.

COMPARTIVE EXAMPLE 6

Example 52 was repeated with the exception that camphor was omitted and the milling was carried out for 48 hours at 50° C. For two polymerization runs, employing 556.6 mg. and 532.1 mg. portions respectively, an average activity of 367 and an average II of 87.6 were obtained.

What is claimed is:

1. A catalyst component which comprises a titanium trichloride material and a monterpenic ketone selected from the group consisting of saturated monocyclic monoterpenic ketones and bicyclic monoterpenic ketones, said monoterpenic ketone being present in an amount from about 2% to about 15% by weight of said titanium trichloride material.

2. The catalyst component of claim 1 wherein said titanium trichloride material is selected from the group consisting of material formed by: (a) reduction of titanium tetrachloride with a metal; (b) reduction of titanium tetrachloride with hydrogen; (c) reduction of titanium tetrachloride with an organometallic compound and (d) grinding titanium trichloride and a halide of a Group III metal.

3. The catalyst component of claim 2 wherein said monoterpenic ketone is a saturated monocyclic monterpenic ketone.

4. The catalyst component of claim 3 wherein said ketone is menthone or carvomenthone.

5. The catalyst component of claim 3 wherein said ketone is menthone and said titanium trichloride material is formed by reduction of titanium tetrachloride with aluminum.

6. The catalyst component of claim 2 wherein said monoterpenic ketone is a bicyclic monoterpenic ketone.

7. The catalyst component of claim 6 wherein said ketone is thujone, carone, verbanone, verbenone, camphor or fenchone.

8. The catalyst component of claim 7 wherein said ketone is thujone.

9. The catalyst component of claim 7 wherein said ketone is camphor.

10. The catalyst component of claim 7 wherein said ketone is fenchone.

11. The catalyst component of claim 7 wherein said ketone is thujone and said titanium trichloride material is formed by reduction of titanium tetrachloride with aluminum.

12. The catalyst component of claim 7 wherein said ketone is camphor and said titanium trichloride material is formed by reduction of titanium tetrachloride with aluminum.

13. The catalyst component of claim 7 wherein said ketone is fenchone and said titanium trichloride material is formed by reduction of titanium tetrachloride with aluminum.

14. The catalyst component of claim 1 further comprising a compound selected from the group consisting of ionic compounds and polar compounds in an amount from about 0.1% to about 100% by weight of said monoterpenic ketone, said ionic compounds being selected from the group consisting of the ionic salts of the Group IA and II A metals where the anions are halide, sulfate, nitrate, stearate, borate, silicate, aluminate, citrate or thiosulfate; the stearate salts of copper and zinc; quaternary ammonium salts of the general formula $R_4N^+X^-$ where R is hydrogen, alkyl or aryl and X is halide or sulfate; the finely divided, water-soluble ammonium salt of an amido polyphosphate formed by the dry vapor phase reaction of $P_2O_5$ and anhydrous ammonia; the alkali, alkaline earth metal and iron salts of citric acid; the alkyl alkali metal sulfates; the nongaseous halogens; and mixtures thereof; said polar compounds being selected from the group consisting of alkyl acid pyrophosphates of the formula

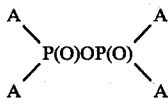

where A is selected from the group consisting of OR and OH and R is $C_1$-$C_4$ alkyl, with the proviso that at least one A is OR; trialkyl phosphates of the formula $(RO)_3PO$ where R is an alkyl group; polymeric silicon compounds selected from the group consisting of amorphous silica and the siloxanes; the dialkyl phosphoric acids of the formula

where R is an alkyl; the dialkyl maleates and fumarates; the reaction product of a compound of the formula $(C_6H_5)_2Si(OH)_2$ and a titanate of the formula $Ti(OR)_4$, where R is an alkyl group; the compounds of the formula $RCONH_2$ where R is alkyl, and polyacrylamide; an elemental solid selected from the group consisting of graphite, amorphous carbon and sulfur; starch; the alkyl ketones with the proviso that the total number of carbon atoms in the two alkyl groups ranges from 20 to 30; epoxides and the polymeric derivatives thereof; the trialkyl borates; urea and the alkyl substituted ureas; the alkylene diamine tetraacetic acids; the water soluble cellulose ethers; the phthalocyanine colorants selected from the group consisting of phthalocyanine, copper phthalocyanine, chlorinated copper phthalocyanine and sulfonated copper phthalocyanine; the $C_1C_4$ acrylates; compounds of the formula $(PNX_2)_n$ where X is chlorine or bromine and n is from 2 to 4; compounds of the formula

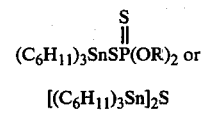

$[(C_6H_{11})_3Sn]_2S$ where R is $C_1$-$C_6$ alkyl; the nongaseous alpha-olefins; and mixtures thereof.

15. The catalyst component of claim 14 wherein said compound is an ionic compound selected from the group consisting of alkali metal halides and nongaseous halogens.

16. The catalyst component of claim 15 wherein said ionic compound is sodium bromide.

17. The catalyst component of claim 15 wherein said ionic compound is iodine.

18. The catalyst component of claim 16 wherein said ketone is camphor, and said titanium trichloride material is a material formed by reduction of titanium tetrachloride with aluminum.

19. The catalyst component of claim 17 wherein said ketone is camphor, and said titanium trichloride material is a material formed by reduction of titanium tetrachloride with aluminum.

20. The catalyst component of claim 14 wherein said compound is a polar compound selected from the group consisting of: compounds of the formula $RCONH_2$, where R is alkyl; and the alkyl ketones with the proviso that the total number of carbon atoms in the two alkyl groups ranges between 20 and 30.

21. The catalyst component of claim 20 wherein said polar compound is stearamide.

22. The catalyst component of claim 21 wherein said ketone is fenchone and said titanium trichloride material is a material formed by reduction of titanium tetrachloride with aluminum.

23. The catalyst component of claim 20 wherein said polar component is laurone.

24. The catalyst component of claim 23 wherein said ketone is menthone and said titanium trichloride material is a material formed by reduction of titanium tetrachloride with aluminum.

25. A catalyst component obtained by dry grinding a titanium trichloride material and a monoterpenic ketone selected from the group consisting of saturated monocyclic monoterpenic ketones and bicyclic monoterpenic ketones, said monoterpenic ketone being present in an amount from about 2% to about 15% by weight of said titanium trichloride material.

26. The catalyst component of claim 25 wherein said titanium trichloride material is selected from the group consisting of material formed by: (a) reduction of titanium tetrachloride with a metal; (b) reduction of titanium tetrachloride with hydrogen; (c) reduction of titanium tetrachloride with an organometallic compound and (d) grinding titanium trichloride and a halide of a Group III metal.

27. The catalyst component of claim 26 wherein said monoterpenic ketone is a bicyclic monoterpenic ketone.

28. The catalyst component of claim 26 wherein said ketone is camphor and said titanium trichloride material is formed by reduction of titanium trichloride with aluminum.

29. The catalyst component of claim 25 further comprising a compound selected from the group consisting of ionic compounds and polar compounds in an amount from about 0.1% to about 100% by weight of said monoterpenic ketone, said ionic compounds being selected from the group consisting of the ionic salts of the Group IA and IIA metals where the anions are halide, nitrate, stearate, borate, silicate, aluminate, citrate or thiosulfate; the stearate salts of copper and zinc; quaternary ammonium salts of the general formula $R_4N^+X^-$ where R is hydrogen, alkyl or aryl and X is halide or sulfate; the finely divided, water-soluble ammonium salt of an amido polyphosphate formed by the dry vapor phase reaction of $P_2O_5$ and anhydrous ammonia; the alkali alkaline earth metal and iron salts of citric acid; the alkyl alkali metal sulfates; the nongaseous halogens; and mixtures thereof; said polar compounds being selected from the group consisting of alkyl acid pyrophosphates of the formula

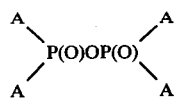

where A is selected from the group consisting of OR and OH and R is $C_1$–$C_4$ alkyl, with the proviso that at least one A is OR; trialkyl phosphates of the formula $(RO)_3PO$ where R is an alkyl group; polymeric silicon compounds selected from the group consisting of amorphous silica and the siloxanes; the dialkyl phosphoric acids of the formula

where R is an alkyl; the dialkyl maleates and fumarates; the reaction product of a compound of the formula $(C_6H_5)_2Si(OH)_2$ and a titanate of the formula $Ti(OR)_4$, where R is an alkyl group; the compounds of the formula $RCONH_2$ where R is alkyl, and polyacrylamide; an elemental solid selected from the group consisting of graphite, amorphous carbon and sulfur; starch; the alkyl ketones with the proviso that the total number of carbon atoms in the two alkyl groups ranges from 20 to 30; epoxides and the polymeric derivatives thereof; the trialkyl borates; urea and the alkyl substituted ureas; the alkylene diamine tetraacetic acids; the water soluble cellulose ethers; the phthalocyanine colorants selected from the group consisting of phthalocyanine, copper phthalocyanine, chlorinated copper phthalocyanine and sulfonated copper phthalocyanine; the $C_1$–$C_4$ acrylates; compounds of the formula $(PNX_2)_n$ where X is chlorine or bromine and n is from 2 to 4; compounds of the formula

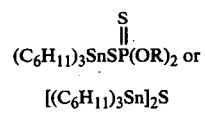

$[(C_6H_{11})_3Sn]_2S$ where R is $C_1$–$C_6$ alkyl; the nongaseous alpha-olefins; and mixtures thereof.

30. A catalyst composition which comprises a titanium trichloride material, a saturated monocyclic monoterpenic ketone or a bicyclic monoterpenic ketone, and an alkyl aluminum compound, said monoterpenic ketone being present in an amount from about 2% to about 15% by weight of said titanium trichloride material.

* * * * *

UNITED STATES PATENT AND TRADEMARK OFFICE
CERTIFICATE OF CORRECTION

PATENT NO. : 4,124,530
DATED : November 7, 1978
INVENTOR(S) : Gregory G. Arzoumanidis It is certified that error appears in the above-identified patent and that said Letters Patent are hereby corrected as shown below:

Column 1, line 31, "terahalide" should be --tetrahalide--;
Column 3, line 33, delete " . " after "product";
Column 5, line 52, delete "$C_2 14C_4$" and insert --$C_2$-$C_4$--;
Column 6, line 22, delete "aoout" and insert --about--; and
In TABLE I, Under Column Heading "Milling Temperature"
   In Example 13, insert -- 8 hrs. at 40-53°C. --.

*Signed and Sealed this*

*Twentieth* Day of *March 1979*

[SEAL]

Attest:

RUTH C. MASON
*Attesting Officer*

DONALD W. BANNER
*Commissioner of Patents and Trademarks*